United States Patent
Klipper et al.

(10) Patent No.: US 7,708,892 B2
(45) Date of Patent: May 4, 2010

(54) CONDITIONING OF ION EXCHANGERS FOR ADSORPTION OF OXOANIONS

(75) Inventors: Reinhold Klipper, Köln (DE); Michael Schelhaas, Köln (DE); Stefan Neumann, Leverkusen (DE); Jens Stoll, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 527 days.

(21) Appl. No.: 11/810,520

(22) Filed: Jun. 6, 2007

(65) Prior Publication Data

US 2008/0272055 A1 Nov. 6, 2008

(30) Foreign Application Priority Data

May 3, 2007 (DE) .................. 10 2007 020 688

(51) Int. Cl.
  *C02F 1/42* (2006.01)
(52) U.S. Cl. ....................... 210/683; 210/688
(58) Field of Classification Search ............... 210/683, 210/688
  See application file for complete search history.

(56) References Cited

U.S. PATENT DOCUMENTS

| 3,586,646 | A | 6/1971 | Corte et al. | 260/2.2 R |
| 3,637,535 | A | 1/1972 | Corte et al. | 260/2.1 |
| 4,419,245 | A | 12/1983 | Barrett et al. | 210/681 |
| 4,427,794 | A | 1/1984 | Lange et al. | 521/28 |
| 4,444,961 | A | 4/1984 | Timm | 526/88 |
| 6,696,503 | B2 | 2/2004 | Happ et al. | 521/30 |
| 7,282,153 | B2 * | 10/2007 | Barrett et al. | 210/688 |
| 2006/0264521 | A1 | 11/2006 | Podszun et al. | 521/25 |
| 2006/0273014 | A1 | 12/2006 | Klipper et al. | 210/681 |
| 2007/0241057 | A1 | 10/2007 | Klipper et al. | 210/668 |

FOREIGN PATENT DOCUMENTS

| EP | 1 568 660 | 8/2005 |
| EP | 1 832 622 | 9/2007 |
| WO | 93/12167 | 6/1993 |

OTHER PUBLICATIONS

R. Kunin and J. Meyers in Journal of American Chemical Society, vol. 69, p. 2874 ff. (1947) "The Anion Exchange Equilibria in an Anion Exchange Resin".
V. Lenoble et al., Science of the Total Environment 326 (2004) 197-207 "As(V) retention and As(III) simultaneous oxidation and removal on a $MnO_2$-loaded polystyrene resin".
I. Rau et al., Journal of Radioanalytical and Nuclear Chemistry, vol. 246, No. 3 (2000) 597-600 "Arsenic(V) removal from aqueous solutions by iron(III) loaded chelating resin".
M. Hruby et al., Collect.Czech. Chem. Commun. vol. 68, 2003, 2159-2170 "Bifunctional Ion Exchange Resin with Thiol and Quaternary Ammonium Groups for the Sorption of Arsenate".
J. R. Millar et al, J. Chem. Soc. 1963, 218-225 "Solvent-modified Polymer Networks. Part I. The Preparation and Characterisation of Expanded-network and Macroporous Styrene-Divinylbenzene Copolymers and their Sulphonates".

* cited by examiner

*Primary Examiner*—Chester T Barry
(74) *Attorney, Agent, or Firm*—Nicanor A. Kohncke

(57) ABSTRACT

The present invention relates to the use of inorganic salts for increasing the adsorption of oxoanions and/or thioanalogues thereof to metal-doped ion exchangers, preferably to iron oxide/iron oxyhydroxide-containing ion exchangers, preferably from water or aqueous solutions, and also the conditioning of these metal-doped ion exchangers having increased adsorption behaviour toward oxoanions and/or thioanalogues thereof by using inorganic salts with the exception of amphoteric ion exchangers which have both acidic and basic groups as functional groups.

14 Claims, No Drawings

CONDITIONING OF ION EXCHANGERS FOR ADSORPTION OF OXOANIONS

The present invention relates to the use of inorganic salts for increasing the adsorption of oxoanions and/or thioanalogues thereof to metal-doped ion exchangers, preferably to iron oxide/iron oxyhydroxide-containing ion exchangers, preferably from water or aqueous solutions, and also the conditioning of these metal-doped ion exchangers having increased adsorption behaviour toward oxoanions and/or thioanalogues thereof by using inorganic salts with the exception of amphoteric ion exchangers which have both acidic and basic groups as functional groups.

In addition, the invention relates to a process for increasing the thermal stability of metal-doped ion exchangers, preferably iron oxide/iron oxyhydroxide-containing ion exchangers, particularly preferably metal-doped ion exchangers, for the adsorption of oxoanions and/or thioanalogues thereof, with the exception of amphoteric ion exchangers, which contain both acidic and basic groups as functional groups, characterized in that these ion exchangers, subsequently to their production, are conditioned with inorganic salts.

BACKGROUND OF THE INVENTION

Oxoanions within the meaning the of present invention have the formula $X_nO_m^-$, $X_nO_m^{2-}$, $X_nO_m^{3-}$, $HX_nO_m^-$ or $H_2X_nO_m^{2-}$ (where n is an integer 1, 2, 3 or 4, m is an integer 3, 4, 6, 7, or 13, and X is a metal or transition metal of the series Au, Ag, Cu, Si, P, S, Cr, Ti, Te, Se, V, As, Sb, W, Mo, U, Os, Nb, Bi, Pb, Co, Ni, Fe, Mn, Ru, Re, Tc, Al, B, or a nonmetal of the series F, Cl, Br, I, CN, C, N. According to the invention, the expression oxoanions preferably means the formulae $XO_m^{2-}$, $XO_m^{3-}$, $HXO_m^-$ or $H_2XO_m^{2-}$, where m is an integer 3 or 4 and X is a metal or transition metal of the series P, S, Cr, Te, Se, V, As, Sb, W, Mo, Bi, or a nonmetal of the series Cl, Br, I, C, N. Particularly preferably, according to the invention, the expression oxoanions means oxoanions of arsenic in the oxidation states (III) and (V), of antimony in the oxidation states (III) and (V), of sulphur as sulphate, of phosphorus as phosphate, of chromium as chromate, of bismuth as bismuthate, of molybdenum as molybdate, of vanadium as vanadate, of tungsten as tungstate, of selenium as selenate, of tellurium as tellurate or of chlorine as chlorate or perchlorate. Oxoanions which are particularly preferred according to the invention are $H_2AsO_3^-$, $H_2AsO_4^-$, $HAsO_4^{2-}$, $AsO_4^{3-}$, $H_2SbO_3^-$, $H_2SbO_4^-$, $HSbO_4^{2-}$, $SbO_4^{3-}$, $SeO_4^{2-}$, $ClO_3^-$, $ClO_4^-$, $BiO_4^{2-}$, $SO_4^{2-}$, $PO_4^{3-}$. According to the invention, those which are very particularly preferred are the oxoanions $H_2AsO_3^-$, $H_2AsO_4^-$, $HAsO_4^{2-}$ and $AsO_4^{3-}$ and also $SeO_4^{2-}$. Within the meaning of the present invention, the expression oxoanions in the context of the present disclosure also comprises the thioanalogues, where instead of O in the abovementioned formulae, S represents sulphur.

The purity requirements of drinking water have markedly increased in recent decades. Health authorities of numerous countries have developed limiting values for heavy metal concentrations in waters. This relates, in particular, to heavy metals such as arsenic, antimony or chromium.

Under certain conditions, for example arsenic compounds can be extracted from rocks and thus pass into the groundwater. In natural waters, arsenic occurs as an oxidic compound containing trivalent and pentavalent arsenic. In this case it is found that in the pHs prevailing in natural waters the species $H_3AsO_3$, $H_2AsO_3^-$, $H_2AsO_4^-$, $HAsO_4^{2-}$ principally occur.

In addition to the chromium, antimony and selenium compounds, readily absorbable arsenic compounds are highly toxic and carcinogenic. However, bismuth passing into the groundwater from ore working is also not safe for health.

In many regions of the USA, India, Bangladesh, China and also in South America, in part very high concentrations of arsenic occur in the groundwater.

Numerous medical studies now confirm that people who are exposed to high arsenic pollution over a long period can develop pathological skin changes (hyperkeratosis) and various types of tumour as a result of chronic arsenic poisoning.

Ion exchangers are widely used for purifying raw waters, wastewaters and aqueous process streams. Ion exchangers are also suitable for removing oxoanions, for example arsenate. For instance, R. Kunin and J. Meyers in Journal of American Chemical Society, Volume 69, page 2874 ff. (1947) describe the exchange of anions, such as, for example, arsenate, using ion exchangers which have primary, secondary and tertiary amino groups.

WO 2004/110623 A1 and EP-A 1 495 800 describe processes for producing iron oxide/iron oxyhydroxide-containing carboxyl-containing ion exchangers. This material adsorbs arsenic down to low residual concentrations, but is limited in its uptake capacity.

EP-A 1 568 660 discloses a process for removing arsenic from water by contacting the water with a strongly basic anion exchanger which contains a specially defined metal ion or a metal-containing ion. EP-A 1 568 660 refers to the fact that the selectivity towards arsenic increases when secondary and tertiary amino groups are converted to quaternary ammonium groups by alkylation, as a result of which strongly basic anion exchangers are characterized according to EP-A 1 568 660. It is of importance that the salt formed from metal and arsenate has a $K_{sp}$ no greater than $10^{-5}$.

In addition, inter alia a process for removing arsenic(III) or arsenic(V) from water by contacting the water with metal-doped ion exchangers is taught in V. Lenoble et al., Science of the Total Environment 326 (2004) 197-207 using manganese dioxide-doped ion exchangers based on polystyrene, in I. Rao et al., Journal of Radioanalytical and Nuclear Chemistry, Vol. 246, No. 3 (2000) 597-600 based on iron(III)-doped chelate resins, and in M. Hruby et al. Collect. Czech. Chem. Commun. Vol. 68, 2003, 2159-2170.

The arsenic adsorbers known from the prior art do not yet exhibit the desired properties with respect to selectivity, capacity and thermal stability. Therefore there is a need for novel ion exchangers or adsorbers in bead form which are specific for oxoanions and/or thioanalogues thereof, in particular oxoanions of arsenic, which are simple to produce, have an improved adsorption of oxoanions and/or thioanalogues thereof, and also display higher thermal stability.

Higher thermal stability of the adsorbers is desirable, since firstly the adsorbers can be stored before use in storage rooms at higher temperatures, or else can come into contact with hot oxoanion-containing water.

SUMMARY OF THE INVENTION

The solution of the object and therefore subject matter of the present invention is the use of metal-doped ion exchangers with the exception of amphoteric ion exchangers, which have both acidic and basic functional groups, for adsorption of oxoanions and/or thioanalogues thereof, preferably from water or aqueous solutions, characterized in that, before use, they are subjected to conditioning with an inorganic salt.

In the further course of this application, treatment of a metal-doped ion exchanger with an inorganic salt is termed conditioning.

However, the invention also relates to a process for increasing the adsorption of oxoanions and/or thioanalogues thereof to ion exchangers, characterized in that ion exchangers, with the exception of amphoteric ion exchangers, which contain both acidic and basic functional groups, are conditioned with an inorganic salt after the metal doping. The process is preferably employed in water or aqueous solutions.

In the light of the prior art, it was surprising that inorganic salt-conditioned metal-doped, preferably iron oxide/iron oxyhydroxide-containing ion exchangers, with respect to the prior art, exhibit not only markedly improved oxoanion and thioanion adsorption, but are also generally suitable for use for adsorption of oxoanions and/or thioanalogues thereof, preferably of arsenates, antimonates, phosphates, chromates, molybdates, bismutates, tungstates or selenates, particularly preferably of arsenates or antimonates of the oxidation states (III) and (V) or selenates from aqueous solutions.

In a preferred embodiment, the present invention relates to the use of inorganic salt-treated metal-doped ion exchangers in which the metal is selected from the series iron, calcium, magnesium, aluminium, lanthanum, titanium, zinc, nickel, cobalt, manganese, lithium or tin, particularly preferably with said metals whose salt with the oxoanion and/or thioanalogue thereof to be adsorbed has a $K_{sp}$ no greater than $10^{-5}$, in particular preferably iron oxide/iron oxyhydroxide-containing ion exchangers. The metal content of the ion exchanger to be conditioned with inorganic salt is preferably 5 to 30% of the dry weight of the respective ion exchanger.

In a preferred embodiment, the invention relates to the use of inorganic salts for increasing the oxoanion and/or thioanalogue thereof adsorption capacity to ion exchangers, with the exception of amphoteric ion exchangers, which have both acidic and basic functional groups, wherein the inorganic salts are salts physiologically harmless for humans, since the preferred use is in treating waters for drinking water provision. According to the invention, for the conditioning, use is preferably made of sodium sulphate, sodium carbonate, sodium phosphate, sodium hydrogenphosphate, sodium chloride, potassium sulphate, potassium carbonate, potassium chloride, potassium phosphate, potassium hydrogenphosphate, particularly preferably sodium chloride. The use of the inorganic salt always proceeds not until after the metal doping of the underlying ion exchanger, with, per ml of ion exchanger, use being made of 0.03 gram of inorganic salt in the form of aqueous solutions, preferably 25% strength by weight solutions.

Conditioning of the respective ion exchanger with the inorganic salt preferably proceeds at temperatures of 5 to 30 degrees Celsius, particularly preferably 10 to 25 degrees Celsius, in particular preferably at room temperature.

Metering in the aqueous solution of the inorganic salt is not critical with respect to time. It can, depending on the technical circumstances, proceed as rapidly as possible.

The ion exchangers can be brought into contact with the aqueous solutions of the inorganic salt with stirring or by filtration in columns.

Per mole of ion exchanger, preferably use is made of 1 to 10 mol, particularly preferably 3 to 6 mol, of inorganic salt.

Preferably, the aqueous solution of the inorganic salt to be used for conditioning has an inorganic salt content of 10 to 40% by weight, particularly preferably 20 to 30% by weight, and preferably has a pH of 5 to 13, particularly preferably 6 to 11, in particular preferably 7 to 9.

For the conditioning according to the invention with inorganic salt, use is made of metal-doped ion exchangers which preferably have, as functional group, hydroxide, ether, primary amine, secondary amine, tertiary amine, quaternary amine, divalent sulphur, amine oxide, phosphonic acid, iminodiacetic acid or hydroxylamine.

The ion exchangers to be used according to the invention for the conditioning with inorganic salt can be either heterodisperse or monodisperse. According to the invention, use is preferably made of monodisperse ion exchangers. Their particle size is generally 250 to 1250 μm, preferably 280-600 μm.

The monodisperse bead polymers underlying the monodisperse ion exchangers can be produced by known processes such as, for example, fractionation, atomization, jetting, or by the seed-feed technique.

The production of monodisperse ion exchangers is known in principle to those skilled in the art. In addition to fractionation of heterodisperse ion exchangers by sieving, a distinction is made between essentially two direct production processes, that is to say atomization or jetting, and the seed-feed process, in the production of the precursors, the monodisperse bead polymers. In the case of the seed-feed process, a monodisperse feed is used which itself can be produced, for example by sieving or by jetting. According to the invention, preferably, for the adsorption of oxoanions, use is made of monodisperse basic ion exchangers obtainable by atomization processes or jetting.

In the present application, those bead polymers or ion exchangers are termed monodisperse in which the uniformity coefficient of the distribution curve is less than or equal to 1.2. The uniformity coefficient is the quotient of the characteristics d60 and d10. D60 describes the diameter at which 60% by mass in the distribution curve are smaller and 40% by mass are greater or equal. D10 denotes the diameter at which 10% by mass in the distribution curve are smaller and 90% by mass are greater than or equal.

The monodisperse bead polymers, the precursor of the ion exchanger, can be produced, for example, by bringing to reaction monodisperse, if appropriate encapsulated, monomer droplets consisting of a monovinylaromatic compound, a polyvinylaromatic compound, and also an initiator or initiator mixture, and if appropriate a porogen in aqueous suspension. To obtain macroporous bead polymers for producing macroporous ion exchangers, the presence of porogen is absolutely necessary. According to the invention either gel-type or macroporous monodisperse basic ion exchangers can be used. In a preferred embodiment of the present invention, monodisperse basic ion exchangers are used, for the production of which use is made of monodisperse bead polymers using microencapsulating monomer droplets. The various production processes of monodisperse bead polymers both by the jetting principle and by the seed-feed principle are known from the prior art to those skilled in the art. At this point, reference may be made to U.S. Pat. No. 4,444,961, EP-A 0 046 535, U.S. Pat. No. 4,419,245 and WO 93/12167.

Monovinylaromatic unsaturated compounds used according to the invention are preferably compounds such as styrene, vinyltoluene, ethylstyrene, alpha-methylstyrene, chlorostyrene or chloromethylstyrene.

Polyvinylaromatic compounds (crosslinkers) preferably used are divinyl-bearing aliphatic or aromatic compounds. Particularly preferably, use is made of divinylbenzene, divinyltoluene, trivinylbenzene, ethylene glycol dimethacrylate, trimethylol propane trimethacrylate, hexa-1,5-diene, octa-1,7-diene, 2,5-dimethyl-1,5-hexadiene and also divinyl ether.

Suitable divinyl ethers are compounds of the general formula (I),

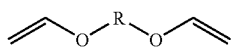 (I)

where
R is a radical of the series $C_nH_{2n}$, $(C_mH_{2m}-O)_p-C_mH_{2m}$ or $CH_2-C_6H_4-CH_2$ and $n \geq 2$, $m=2$ to 8 and $p \geq 2$.

Suitable polyvinyl ethers in the case n>2 are trivinyl ethers of glycerol, trimethylol propane or tetravinyl ethers of pentaerythritol.

In particular preferably, use is made divinyl ethers of ethylene glycol, di-, tetra- or polyethylene glycol, butanediol or poly-THF or the corresponding tri- or tetravinyl ethers. In particular very particular preference is given to divinyl ethers of butanediol and diethylene glycol such as are described in EP-A 11 10 608.

The macroporous property which is desired as an alternative to the gel-type property is already given to the ion exchangers in the synthesis of their precursors, the bead polymers. The addition of what is termed porogen is absolutely necessary for this. The connection of ion exchangers and their macroporous structure is described in German Auslegeschrift (German published specification) DE 1045102 (1957) and in German Auslegeschrift DE 1113570 (1957). As porogen for the production of macroporous bead polymers to be used according to the invention in order to obtain macroporous basic ion exchangers, especially organic substances are suitable which dissolve in the monomer but which dissolve or swell the polymer poorly. Those which may be mentioned by way of examples are aliphatic hydrocarbons such as octane, isooctane, decane, isododecane. In addition compounds which are readily suitable are alcohols having 4 to 10 carbon atoms, such as butanol, hexanol or octanol.

In addition to the monodisperse gel-type ion exchangers, according to the invention, preferably, therefore, use may be made of monodisperse ion exchangers having a macroporous structure for the adsorption of oxoanions and/or thioanalogues thereof. The expression "macroporous" is known to those skilled in the art. Details are described, for example, in J. R. Millar et al J. Chem. Soc. 1963, 218. The macroporous ion exchangers have a pore volume determined by mercury porosimetry of 0.1 to 2.2 ml/g, preferably from 0.4 to 1.8 ml/g.

Functionalization of the bead polymers obtainable by the prior art to give monodisperse ion exchangers having the abovementioned preferred functional groups is likewise substantially known from the prior art to those skilled in the art. Examples of such functionalized ion exchangers are mentioned in DE-A 10200601737, the contents of which are hereby incorporated in their entirety by reference in the present application.

DE-A 10200601737 describes herein a process for producing monodisperse macroporous basic ion exchangers having weakly basic, medium-basic or strongly basic groups by what is termed the phthalimide process, by a) reacting monomer droplets of at least one monovinylaromatic compound and at least one polyvinylaromatic compound and also a porogen and an initiator or an initiator combination to give a monodisperse crosslinked bead polymer, b) amidomethylating this monodisperse crosslinked bead polymer with phthalimide derivatives, c) reacting the amidomethylated bead polymer to give a basic ion exchanger having aminomethyl groups and d) reacting the basic ion exchanger by alkylation to give weakly basic to strongly basic anion exchangers having secondary and/or tertiary and/or quaternary amino groups.

According to the invention, for the adsorption of oxoanions and/or thioanalogues thereof from aqueous solutions, preference is given to metal-doped monodisperse ion exchangers produced by the phthalimide process and conditioned with inorganic salt. Their degree of substitution is up to 1.6, that is to say per aromatic ring, on a statistical average up to 1.6 hydrogen atoms are substituted by $CH_2NH_2$ groups. Therefore, using the phthalimide process, high-capacity, crosslinking-free basic ion exchangers can be produced which are outstandingly suitable, after conversion to metal-doped, preferably iron oxide/iron oxyhydroxide-containing ion exchangers, and after conditioning thereof with inorganic salt, for the adsorption of oxoanions and/or thioanalogues thereof, preferably arsenates, antimonates or selenates and/or thioanalogues thereof and contain primary and/or secondary and/or tertiary amino groups or quaternary ammonium groups.

The doping of the ion exchangers to give a metal-doped ion exchanger, which is to be performed before conditioning with inorganic salt, proceeds using corresponding salts of any metal. In the prior art cited at the outset, corresponding metal salts to give the respective metals are mentioned.

In the case of the iron-doped ion exchangers which are preferably according to the invention to be conditioned with inorganic salt, the doping proceeds before conditioning with iron(II) salts or iron(III) salts, preferably with a non-complex-forming iron(II) salt or iron(III)salt. Iron(III) salts which can be used for this are soluble iron(III) salts, preferably iron(III) chloride, iron(III) sulphate or iron(III) nitrate.

As iron(II) salts, use can be made of all soluble iron(II) salts, in particular, use is made of iron(II) chloride, sulphate, nitrate. Preferably, the oxidation of the iron(II) salts in suspension in process step a) proceeds by air.

For the preferred doping with iron, the ion exchangers can be brought into contact with the iron salt solutions with stirring or by filtration in columns. Per mole of iron salt used, in this case, use is made of 1 to 10 mol, preferably 3 to 6 mol, of alkali metal hydroxide or alkaline earth metal hydroxide. Per mole of functional group in the ion exchanger, use is made of 0.05 to 3 mol, preferably 0.2 to 1.2 mol, of iron salt. The pH in the doping step is adjusted using alkali metal hydroxides or alkaline earth metal hydroxides, in particular potassium hydroxide, sodium hydroxide or calcium hydroxide, alkali metal carbonates or alkaline earth metal carbonates or hydrogen carbonates. The pH range in which the doping proceeds, that is the formation of iron oxide/iron oxyhydroxide groups, is in the range between 2 and 12, preferably 3 and 9. The substances to be used in this case are preferably used as aqueous solutions. The concentration of the aqueous alkali metal hydroxide or alkaline earth metal hydroxide solutions can be up to 50% by weight. Preferably, use is made of aqueous solutions having an alkali metal hydroxide or alkaline earth metal hydroxide concentration in the range 20 to 40% by weight. The speed of the metering of the aqueous solutions of alkali metal hydroxide or alkaline earth metal hydroxide is dependent on the level of the desired pH and the technical circumstances. For example, 120 minutes are required for this. After reaching the desired pH, stirring is continued for 1 to 10 hours, preferably 2 to 4 hours. The metering of the aqueous solutions of alkali metal hydroxide or alkaline earth metal hydroxide proceeds at temperatures between 10 and 90° C., preferably at 30 to 60° C.

It has proven useful for the synthesis of iron oxide/iron oxyhydroxide-containing ion exchangers preferably to make use of NaOH or KOH as base. However, any other base can be used which leads to the formation of FeOH groups, such as, for example, $NH_4OH$, $Na_2CO_3$, CaO, $Mg(OH)_2$ etc.

After the conditioning with inorganic salt, the finally conditioned metal-doped ion exchanger is isolated. Isolation within the meaning of the present invention means separating off the ion exchanger from the aqueous solution of the inorganic salt and purifying the finally conditioned ion exchanger. The separation proceeds by measures known to those skilled in the art such as decanting, centrifugation, filtration. The purification proceeds by washing with, for example, deionized water and can comprise a classification for separating off fine fractions or coarse fractions. If appropriate, the metal-doped ion exchangers conditioned with inorganic salt can be dried, preferably at reduced pressure and/or particularly preferably at temperatures between 20° C. and 120° C.

Surprisingly, the ion exchangers conditioned according to the invention with inorganic salt adsorb oxoanions and/or thioanalogues thereof, for example of arsenic, not only in its most various forms, but also, in addition, additionally heavy metals such as, for example, cobalt, nickel, lead, zinc, cadmium, copper. As already described above, the ion exchangers conditioned with inorganic salt to be used according to the invention are equally capable of ion exchange of $HAsO_4^{2-}$ and $H_2AsO_4^-$ isostructural ions such as, for example, dihydrogenphosphates, vanadates, molybdates, tungstates, antimonates, bismuthates, selenates or chromates. The ion exchangers conditioned according to the invention within inorganic salt are suitable, in particular, preferably for the adsorption of the species $H_2AsO_3^-$, $H_2AsO_4^-$, $HAsO_4^{2-}$, $AsO_4^{3-}$, $H_2SbO_3^-$, $H_2SbO_4^-$, $HSbO_4^{2-}$, $SbO_4^{3-}$, $SeO_4^{2-}$.

The metal-doped ion exchangers conditioned according to the invention with inorganic salt, preferably the iron oxide/iron oxyhydroxide-containing conditioned ion exchangers, can preferably be used for purifying waters containing oxoanions and thioanalogues thereof or aqueous solutions of any type. Particularly preferably, they are used for purifying drinking water, wastewater streams of the chemical industry or of refuse incineration plants, and also of mine drainage waters or leachate waters of landfills.

The metal-doped ion exchangers conditioned with inorganic salt to be used according to the invention, preferably the iron oxide/iron oxyhydroxide-containing conditioned ion exchangers of the invention, are preferably used in devices suitable for their tasks.

The invention therefore also relates to devices through which a liquid to be treated can flow, preferably filtration units, particularly preferably adsorption vessels, in particular filter adsorption vessels, filled with metal-doped ion exchangers, preferably with iron oxide/iron oxyhydroxide-containing ion exchangers obtainable by the process described in this application, for removing oxoanions and/or thioanalogues thereof, preferably for removing oxoanions of arsenic, antimony or selenium, in particular of arsenic, from aqueous media or gases, preferably drinking water. The devices can be connected, for example, in the home, to the public sanitary system or the public drinking water supply.

Methods of Analysis

Determination of the Uptake Capacity for Arsenic in the Oxidation State V:

For measurement of the adsorption of arsenic(V), 250 ml of an aqueous solution of $Na_2HAsO_4$ containing an amount of As(V) of 2800 ppb are set to a pH of 8.5 and shaken with 0.3 ml of arsenic adsorber for 24 hours in a 300 ml of polyethylene flask. After 24 hours, the residual amount of arsenic(V) in the supernatant solution is analysed.

Determination of the Thermal Stability of Oxoanion Adsorbers 50 ml of deionized water are charged into a 300 ml ground glass joint flask. To this are added 50 ml of oxoanion adsorber at room temperature. The glass flask is then kept in a drying cabinet for 5 days at 70° C. Thereafter the suspension is charged into a column, the liquid phase flows out, and the adsorber is washed from the top with 100 ml of deionized water. Subsequently its uptake capacity for arsenic is determined by the abovementioned measurement method—determination of the uptake capacity for arsenic in oxidation state V.

Determination of the Amount of Basic Aminomethyl Groups in the Aminomethylated Crosslinked Polystyrene Bead Polymer 100 ml of the aminomethylated bead polymer are jolted on the jolting volumeter and subsequently flushed into a glass column with deionized water. In 1 hour and 40 minutes, 1000 ml of 2% strength by weight sodium hydroxide solution are filtered through. Subsequently, deionized water is filtered through until 100 ml of eluate admixed with phenolphthalein have a consumption of 0.1 n (0.1 normal) hydrochloric acid of at most 0.05 ml.

Number of Perfect Beads After Production 100 beads are viewed under the microscope. The number of beads which have cracks or show splintering is determined. The number of perfect beads results from the difference between the number of damaged beads and 100.

Determination of the Stability of the Resin by the Roller Test

The bead polymer under test is distributed in uniform layer thickness between two plastic cloths. The cloths are placed on a solid horizontal support and subjected to 20 working cycles in a roller apparatus. One working cycle consists of rolling carried out forwards and backwards. After rolling, the number of undamaged beads is determined on representative samples of 100 beads by enumeration under the microscope.

Swelling Stability Test 25 ml of anion exchanger in the chloride form are charged into a column. 4% strength by weight aqueous sodium hydroxide solution, deionized water, 6% strength by weight hydrochloric acid and again deionized water are placed successively into the column, the sodium hydroxide solution and the hydrochloric acid flowing through the resin from the top and the deionized water being pumped through the resin from the bottom. The treatment proceeds under time control via a control apparatus. One working cycle lasts for 1 h. 20 working cycles are carried out. After the end of the working cycles, 100 beads are enumerated from the resin sample. The number of perfect beads which are not damaged by cracks or fractures is determined.

Determination of the Amount of Weakly or Strongly Basic Groups in Anion Exchangers 100 ml of anion exchanger in a glass column are charged with 1000 ml of 2% strength by weight sodium hydroxide solution in 1 hour and 40 minutes. Subsequently the resin is washed with deionized water to remove the excess sodium hydroxide solution.

Determination of the NaCl Number 50 ml of the exchanger in the free base form and washed to neutrality are placed into a column and charged with 950 ml of 2.5% strength by weight aqueous sodium chloride solution. The effluent is collected, made up to 1 liter with deionized water and of this 50 ml are titrated with 0.1 n hydrochloric acid. The resin is washed with deionized water.

Consumed ml 0.1 n hydrochloric acid×4/100=NaCl number in mole/liter resin.

Determination of the NaNO₃ Number

Then, 950 ml of 2.5% strength by weight sodium nitrate solution are filtered through. The effluent is made up to 1000 ml with deionized water. Of this an aliquot, 10 ml, is taken off and analysed for its chloride content by titration with mercury nitrate solution.

Determination of the HCl Number

The resin is washed with deionized water and flushed into a glass beaker. It is admixed with 100 ml of 1 n hydrochloric acid and allowed to stand for 30 minutes. The entire suspension is flushed into a glass column. A further 100 ml of hydrochloric acid are filtered through the resin. The resin is washed with methanol. The effluent is made up to 1000 ml with deionized water. Of this 50 ml are titrated with 1 n sodium hydroxide solution.

(20−consumed ml of 1 n sodium hydroxide solution)/5=HCl number in mole/liter of resin.

The amount of strongly basic groups is equal to the sum of NaNO₃ number and HCl number.

The amount of weakly basic groups is equal to the HCl number.

It will be understood that the specification and examples are illustrative but not limitative of the present invention and that other embodiments within the spirit and scope of the invention will suggest themselves to those skilled in the art.

EXAMPLES

Example 1

1a) Production of a Monodisperse Macroporous Bead Polymer Based on Styrene, Divinylbenzene and Ethylstyrene 3000 g of deionized water were charged into a 10 l glass reactor and a solution of 10 g of gelatine, 16 g of disodium hydrogenphosphate dodecahydrate and 0.73 g of resorcinol in 320 g of deionized water were added and mixed thoroughly. The mixture was heated to 25° C. With stirring, subsequently, a mixture of 3200 g of microencapsulated monomer droplets having a narrow particle size distribution of 3.6% by weight divinylbenzene and 0.9% by weight ethylstyrene (used as commercially conventional isomeric mixture of divinylbenzene and ethylstyrene with 80% divinylbenzene), 0.5% by weight dibenzoyl peroxide, 56.2% by weight styrene and 38.8% by weight isododecane (technical mixture of isomers having a high fraction of pentamethylheptane) was added, wherein the microcapsules consisted of a formaldehyde-cured complex coazervate of gelatine and a copolymer of acrylamide and acrylic acid and 3200 g of aqueous phase having a pH of 12 were added. The mean particle size of the monomer droplets was 460 μm.

The batch was exhaustively polymerized with stirring by temperature elevation according to a temperature programme starting at 25° C. and ending at 95° C. The batch was cooled, washed over a 32 μm sieve and subsequently dried in a vacuum at 80° C. This produced 1893 g of a spherical polymer having a mean particle size of 440 μm, narrow particle size distribution and smooth surface.

The polymer was chalky white in appearance and has a bulk density of approximately 370 g/l.

1b) Production of an Amidomethylated Bead Polymer 3567 g of dichloroethane, 867 g of phthalimide and 604 g of 29.8% strength by weight formalin were charged at room temperature. The pH of the suspension was adjusted to 5.5 to 6 using sodium hydroxide solution. Subsequently the water was removed by distillation. Then, 63.5 g of sulphuric acid were added. The resultant water was removed by distillation. The batch was cooled. At 30° C., 232 g of 65% strength oleum and subsequently 403 g of monodisperse bead polymer produced in accordance with process step 1a) were added. The suspension was heated to 70° C. and stirred at this temperature for a further 6 hours. The reaction broth was taken off, deionized water was added and residual amounts of dichloroethane are removed by distillation.

Yield of amidomethylated bead polymer: 2600 ml

Composition according to elemental analysis: Carbon: 74.9% by weight; Hydrogen: 4.6% by weight; Nitrogen: 6.0% by weight; Remainder: oxygen.

1c) Production of an Aminomethylated Bead Polymer

To 1250 ml of amidomethylated bead polymer from 1b) were added 624 g of 50% strength by weight sodium hydroxide solution and 1093 ml of deionized water at room temperature. The suspension was heated to 180° C. in 2 hours have been stirred at this temperature for 8 hours. The resultant bead polymer was washed with deionized water.

Yield of aminomethylated bead polymer: 1110 ml

This gives, as total yield, estimated, 2288 ml.

Composition by elemental analysis: Nitrogen: 12.6% by weight Carbon: 78.91% by weight; Hydrogen: 8.5% by weight;

From the composition by elemental analysis of the aminomethylated bead polymer, it may be calculated that on a statistical average per aromatic ring, originating from the styrene and divinylbenzene units, 1.34 hydrogen atoms was substituted with aminomethyl groups.

The amount of basic groups was determined as 2.41 mole/liter of resin

1d) Production of a Bead Polymer having Tertiary Amino Groups 1380 ml of deionized water, 920 ml of aminomethylated bead polymer from 1c) and 490 g of 29.7% strength by weight formalin solution were charged into a reactor at room temperature. The suspension was heated to 40° C. The pH of the suspension was adjusted to pH 3 by metering in 85% strength by weight formic acid. In the course of 2 hours, the suspension was heated to reflux temperature (970). During this time, the pH was kept at 3.0 by metering in formic acid. After reaching the reflux temperature, the pH was adjusted to 2 first by metering in formic acid, then by metering in 50% strength by weight sulphuric acid. It was further stirred at pH 2 for 30 minutes. Then, 50% strength by weight sulphuric acid was further added and the pH was adjusted to 1. At pH 1 and reflux temperature, the mixture was stirred for a further 8.5 hours.

The batch was cooled, the resin is filtered off on a sieve and washed with deionized water.

Volume yield: 1430 ml

In a column, 2500 ml of 4% strength by weight aqueous sodium hydroxide solution were filtered through the resin. Subsequently it was washed with water.

Volume yield: 1010 ml

Composition by elemental analysis: Nitrogen: 12.4% by weight Carbon: 76.2% by weight; Hydrogen: 8.2% by weight;

Determination of the amount of basic groups gave 2.22 mol/liter of resin.

Example 2

Production of an Oxoanion Exchanger with Additional Treatment of the Exchanger by Aqueous Sodium Chloride Solution Apparatus: 2 liter reactor, stirrer, thermometer, dropping funnel, metering pump 180 ml of deionized water and 300 ml of monodisperse macroporous anion exchanger with dimethylamino groups from Example 1 were charged into the reactor at room temperature.

243 ml of 40% strength by weight aqueous iron(III) sulphate solution were metered in the course of 60 minutes with stirring. Thereafter the mixture was further stirred for 30 minutes. The pH of the suspension was 1.9.

Then, at 25-30° C., 50% strength by weight sodium hydroxide solution was metered in stepwise.

Sodium hydroxide solution was metered in until the suspension has a pH of 2.5. Then, the mixture was stirred for a further 30 minutes.

Further sodium hydroxide solution is metered in until the suspension had a pH of 3.5. Then the mixture was stirred for a further 30 minutes.

Further sodium hydroxide solution is metered in until the suspension had a pH of 4.0. Then the mixture was stirred for a further 30 minutes.

Further sodium hydroxide solution is metered in until the suspension had a pH of 4.5. Then, the mixture was stirred for a further 30 minutes.

Further sodium hydroxide solution is metered in until the suspension had a pH of 5.0. Then, the mixture was stirred for a further 30 minutes.

Further sodium hydroxide solution is metered in until the suspension had a pH of 6.0. Then, the mixture was stirred for a further 30 minutes.

Further sodium hydroxide solution is metered in until the suspension had a pH of 7.0. Then, the mixture was stirred for a further 2 hours.

Subsequently, in the course of 10 minutes, 37.5 ml of 25% strength by weight aqueous sodium chloride solution were metered in. Thereafter the mixture was further stirred for 30 minutes.

The reaction mixture was placed on a sieve and washed with water. The adsorber remained on the sieve. For further purification, the adsorber was transferred to a column and classified with water from the bottom for removal of liquid and solid impurities.

Volume yield: 465 ml Consumption of sodium hydroxide solution: 2.85 mol NaOH Dry weight: 33.61 gram per 100 ml Iron content: 14% by weight 50 ml of this resin are admixed in a glass beaker with 50 ml of deionized water and 100 ml of 1 n hydrochloric acid. The suspension is stirred for 30 minutes and subsequently charged into a glass column. The liquid is drained off. A further 100 ml of 1 n hydrochloric acid is filtered through the resin in 20 minutes. Subsequently, 200 ml of methanol are filtered through. All eluates are collected and combined and titrated with 1 n sodium hydroxide solution against methyl orange.

The amount of aminomethyl groups in 1 liter of aminomethylated resin is calculated from the following formula: $(200-V) \cdot 20$=mole of aminomethyl groups per liter of resin, where V is the volume of 1 n sodium hydroxide solution consumed in the titration.

Determination of the Degree of Substitution of the Aromatic Rings of the Crosslinked Bead Polymer by Aminomethyl Groups The amount of aminomethyl groups in the total amount of the aminomethylated resin is determined by the above method.

From the amount of bead polymer used, A in grams, by division by the molecular weight, the molar amount of aromatics present in this amount is calculated.

For example, from 300 gram of bead polymer, 950 ml of aminomethylated bead polymer containing an amount of 1.8 mol/l of aminoethyl groups are produced.

950 ml of aminomethylated bead polymer contain 2.82 mol of aromatics.

Per aromatic, then, 1.8/2.81=0.64 mol of aminomethyl groups are present.

The degree of substitution of the aromatic rings of the crosslinked bead polymer by aminomethyl groups is 0.64.

Chloride content: 0.76% by weight

Example 3

Production of an Oxoanion Exchanger without Treatment of the Exchanger with Aqueous Sodium Chloride Solution Apparatus: 2 liter reactor, stirrer, thermometer, dropping funnel, metering pump 180 ml of deionized water and 300 ml of monodisperse macroporous anion exchanger having dimethylamino groups from Example 1 were charged into the reactor at room temperature.

In the course of 60 minutes, 243 ml of 40% strength by weight aqueous iron(III) sulphate solution were metered in with stirring. Thereafter, the mixture was further stirred for 30 minutes. The pH of the suspension was 1.9.

Then, 50% strength by weight sodium hydroxide solution was metered in stepwise at 25-30° C.

Sodium hydroxide solution was metered in until the suspension has a pH of 2.5. Then, the mixture was stirred for a further 30 minutes.

Further sodium hydroxide solution was metered in until the suspension has a pH of 3.5. Then, the mixture was stirred for a further 30 minutes.

Further sodium hydroxide solution was metered in until the suspension has a pH of 4.0. Then, the mixture was stirred for a further 30 minutes.

Further sodium hydroxide solution was metered in until the suspension has a pH of 4.5. Then, the mixture was stirred for a further 30 minutes.

Further sodium hydroxide solution was metered in until the suspension has a pH of 5.0. Then, the mixture was stirred for a further 30 minutes.

Further sodium hydroxide solution was metered in until the suspension has a pH of 6.0. Then, the mixture was stirred for a further 30 minutes.

Further sodium hydroxide solution was metered in until the suspension has a pH of 7.0. Then, the mixture was stirred for a further 2 hours.

The reaction mixture was placed on a sieve and washed with water. The adsorber remained on the sieve. For further purification, the adsorber was transferred to a column and classified with water from the bottom to remove liquid and solid impurities.

Volume yield: 480 ml Consumption of sodium hydroxide solution: 2.83 mol NaOH Dry weight: 33.95 gram per 100 ml Iron content: 13% by weight

Example 4

Determination of arsenic adsorption—see Table 1

By dissolving disodium hydrogenarsenate in water, a solution was produced which contained 2800 ppb of arsenic. The pH of this solution was adjusted to pH 8.5.

To 250 grams of this solution, 0.3 ml of adsorber from Example 3 were added. The suspension was shaken for 24 hours at room temperature.

Subsequently, the residual content of arsenic in the supernatant solution was analysed.

Residual content of arsenic: 15 ppb

Example 5

Determination of arsenic adsorption—see Table 1

By dissolving disodium hydrogenarsenate in water, a solution was produced which contains 2800 ppb of arsenic. The pH of this solution was adjusted to pH 8.5.

To 250 grams of this solution, 0.3 ml of adsorber from Example 2 were metered in. The suspension was shaken for 24 hours at room temperature.

Subsequently, the residual arsenic content in the supernatant solution was analysed.

Residual content of arsenic: 7 ppb

Example 6

See Table 2

Determination of the Thermal Stability and Uptake Capacity for Arsenic of a Non-conditioned Oxoanion Adsorber 50 ml of adsorber from Example 3 were introduced into 50 ml of deionized water and kept at 70° C. for 5 days. The suspension was cooled, subsequently added to a column and 100 ml of deionized water were filtered through the resin.

By dissolving disodium hydrogenarsenate in water, a solution was produced which contains 2800 ppb of arsenic. The pH of this solution was adjusted to pH 8.5.

To 250 grams of this solution are added 0.3 ml of adsorber from Example 6. The suspension was shaken for 24 hours at room temperature.

Subsequently, the residual arsenic content in the supernatant solution was analysed.

Residual arsenic content: 550 ppb

Example 7

See Table 2

Determination of the Thermal Stability and Uptake Capacity for Arsenic of a Conditioned Oxoanion Adsorber 50 ml of adsorber from Example 2 are introduced into 50 ml of deionized water and kept at 70° C. for 5 days. The suspension was cooled, subsequently added to a column, and 100 ml of deionized water were filtered through the resin.

By dissolving disodium hydrogenarsenate in water, a solution was produced which contains 2800 ppb of arsenic. The pH of this solution was adjusted to pH 8.5.

To 250 grams of this solution, 0.3 ml of adsorber from Example 7 were added. The suspension was shaken for 24 hours at room temperature.

Subsequently, the residual arsenic content in the supernatant solution was analysed.

Residual arsenic content: 45 ppb

TABLE 1

Table 1 Results on the uptake capacity of arsenic from conditioned and non-conditioned adsorbers

| Example | Adsorber | Conditioning of the adsorber | Residual amount of arsenic in ppb |
|---|---|---|---|
| 4 | Example 3 | Conditioned with aqueous sodium chloride solution | 7 |
| 5 | Example 2 | Not conditioned with aqueous sodium chloride solution | 15 |

TABLE 2

Table 2 Results on uptake capacity of arsenic from conditioned and non-conditioned adsorbers after storage at 70° C. for 5 days.

| Example | Adsorber | Conditioning of the adsorber | Residual amount of arsenic in ppb |
|---|---|---|---|
| 6 | Example 2 | Not conditioned with aqueous sodium chloride solution | 550 |
| 7 | Example 3 | Conditioned with aqueous sodium chloride solution | 45 |

What is claimed is:

1. A method for the adsorption of oxoanions and/or thioanalogues thereof, comprising:
   conditioning a metal-doped ion exchanger other than an amphoteric ion exchanger with an inorganic salt, thereby forming a conditioned ion exchanger, and then contacting said oxoanions and/or thioanalogues thereof with the conditioned ion exchanger.

2. The method according to claim 1, wherein the metal-doped ion exchanger has been doped with a metal of the series iron, calcium, magnesium, aluminium, lanthanum, titanium, zinc, nickel, cobalt, manganese, lithium or tin.

3. The method according to claim 2, wherein the metal comprises iron in the form of iron oxide and/or iron oxyhydroxide.

4. The method according to claim 1, wherein the conditioned ion exchanger comprises one or more functional groups of the series hydroxide, ether, primary amine, secondary amine, tertiary amine, quaternary amine, divalent sulphur, amine oxide, phosphonic acid, iminodiacetic acid or hydroxylamine.

5. The method according to claim 1, wherein metal of the metal-doped ion exchanger together with the oxoanion and/or thioanalogue thereof forms a salt having a $K_{sp}$ not greater than $10^{-5}$.

6. The method according to claim 1, wherein the metal-doped ion exchanger is monodisperse.

7. The method according to claim 6, wherein the metal-doped ion exchanger is macroporous.

8. The method according to claim 6, wherein a precursor to the metal-doped ion exchanger is produced by an atomization or jetting process.

9. The method according to claim 1, wherein the oxoanions are represented as one or more of the formulae:

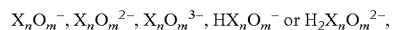

$$X_nO_m^-, X_nO_m^{2-}, X_nO_m^{3-}, HX_nO_m^- \text{ or } H_2X_nO_m^{2-},$$

wherein
n is an integer 1, 2, 3 or 4,
m is an integer 3, 4, 6, 7, or 13, and

X is a metal transition metal, or non-metal of the series Au, Ag, Cu, Si, P, S, Cr, Ti, Te, Se, V, As, Sb, W, Mo, U, Os, Nb, Bi, Pb, Co, Ni, Fe, Mn, Ru, Re, Tc, B, Al, F, Cl, Br, I, CN, C, or N.

10. The method according to claim 9, wherein the oxoanions are one or more of $H_2AsO_3^-$, $H_2AsO_4^-$, $HAsO_4^{2-}$, $AsO_4^{3-}$, $H_2SbO_3^-$, $H_2SbO_4^-$, $HSbO_4^{2-}$, $SbO_4^{3-}$, or $SeO_4^{2-}$.

11. The method according to claim 1, wherein the oxoanions and/or thioanalogues are a part of a water or aqueous solution.

12. The method according to claim 11, wherein the water is drinking water, wastewater streams of the chemical industry or of refuse incineration plants, of mine drainage waters or leachate waters of landfills.

13. The method according to claim 1, wherein the ion exchanger is part of a device through which the oxoanions and/or thioanalogues, contained as a part of a liquid, can flow.

14. The method according to claim 1, wherein the inorganic salt is a salt of the series sodium sulphate, sodium carbonate, sodium phosphate, sodium hydrogenphosphate, sodium chloride, potassium sulphate, potassium carbonate, potassium chloride, potassium phosphate, or potassium hydrogenphosphate.

* * * * *